United States Patent [19]

Gruber et al.

[11] Patent Number: 4,491,646

[45] Date of Patent: Jan. 1, 1985

[54] AQUEOUS HYDROXYL-ACRYLIC LATEX AND MULTI-ISOCYANATE ADHESIVE COMPOSITION

[75] Inventors: Norma J. Gruber, Worthington; Clois E. Powell, Westerville, both of Ohio

[73] Assignee: Ashland Oil, Inc., Ashland, Ky.

[21] Appl. No.: 537,294

[22] Filed: Sep. 29, 1983

[51] Int. Cl.$^3$ ............... C08L 35/02; C08G 18/62; C09J 3/16
[52] U.S. Cl. .................. 524/558; 428/425.1; 524/517; 524/523; 525/123
[58] Field of Search .............. 524/558, 507; 525/123; 428/425.1

[56] References Cited

U.S. PATENT DOCUMENTS

| | | | |
|---|---|---|---|
| 3,632,789 | 1/1972 | Wilhelm | 524/555 |
| 3,931,088 | 1/1976 | Sakurada et al. | 524/501 |
| 4,215,023 | 7/1980 | Strolle | 525/123 |
| 4,268,641 | 5/1981 | Koenig et al. | 524/558 |

OTHER PUBLICATIONS

"Characteristics of Fine Particles", Chemical Engineering, p. 207, Jun. 11, 1962.

Primary Examiner—C. Warren Ivy
Attorney, Agent, or Firm—Mueller and Smith

[57] ABSTRACT

Disclosed is an improved aqueous latex adhesive composition of the type having an aqueous latex in admixture with an organic solvent-dispersed multi-isocyanate cross-linking agent and a thickener. The improvement for a room temperature curable adhesive composition having improved water resistance comprises the curable ingredients consisting essentially of an aqueous hydroxyl functional acrylic latex which contains hydroxyl groups as its only isocyanate reactive functionality and the multi-isocyanate cross-linking agent. Desirably, fillers incorporated into the adhesive composition are formed into a filler grind prior to incorporation into the adhesive composition. The adhesive composition is especially useful as a structural adhesive in structural lamination manufacture.

20 Claims, No Drawings

4,491,646

AQUEOUS HYDROXYL-ACRYLIC LATEX AND MULTI-ISOCYANATE ADHESIVE COMPOSITION

BACKGROUND OF THE INVENTION

The present invention relates to aqueous adhesive compositions curable at room temperature and more particularly to an improved aqueous latex adhesive composition possessing improved water resistance and being especially adapted for use in structural lamination manufacture.

Various forms of plywood have found utility as structural or load-bearing components in the construction industry. While urea resins, melamine-urea co-condensation resins and phenol resins initially predominated as the adhesives of choice in plywood manufacture, aqueous-based adhesives have more recently found general acceptance in plywood manufacture. Aqueous adhesives can reduce the amount of organic volatiles released from the adhesive composition upon drying and generally possess less organic material which can be released by the adhesive during use of the laminates over time. The reduction of water-sensitivity of the aqueous adhesives, however, was an initial concern of laminate manufacturers. This problem has been addressed by the art and several solutions proposed.

The solution germane for present purposes is the protected-isocyanate approach disclosed in U.S. Pat. No. 3,931,088. The water-resistant adhesive reported therein consists of an aqueous SBR or similar latex and an isocyanate dispersed in a hydrophobic solution of organic solvent. The latex, the surfactant associated with the latex, or an added ingredient bears active-hydrogen groups for linking with the isocyanate at room or elevated temperature. While such adhesive composition has advanced practical use of aqueous latex adhesives in structural lamination production, improvement for room temperature curable adhesive compositions having improved water resistance still has been needed. Such need is addressed by the improved latex adhesive composition disclosed herein.

BROAD STATEMENT OF THE INVENTION

The present invention is an improved aqueous latex adhesive composition of the type having an aqueous latex in admixture with an organic solvent-dispersed multi-isocyanate cross-linking agent, and a thickener. The improvement is for a room temperature-curable adhesive composition having improved water resistance. The improved adhesive composition has curable ingredients consisting essentially of an aqueous hydroxyl-functional acrylic latex which contains hydroxyl groups as its only isocyanate-reactive functionality; and the multi-isocyanate cross-linking agent. No other source of functionality reactive with the cross-linking agent is contained in the improved aqueous latex adhesive composition including, for example, surfactants, protective colloids, thickeners, fillers, and other ingredients normally associated with the adhesive composition. Also, the latex desirably is synthesized from only acrylic monomers for high performance applications.

Another aspect of the present invention is a method for compounding the improved aqueous latex adhesive composition of the present invention. Such process comprises mixing the organic solvent-dispersed multi-isocyanate cross-linking agent, a thickener, and an aqueous hydroxyl-functional acrylic latex which contains hydroxyl groups as its only isocyanate reactive functionality. An especially preferred embodiment involves the formation of a grind of inert fillers for inclusion in the adhesive composition formed above. Desirably, also, the particle size of the acrylic latex and the particle size of the pigment grind are adjusted to be about the same.

Advantages of the present invention include a latex adhesive composition ideally suited for manufacturing structural laminates, eg. plywood. A further advantage is a structural adhesive composition which is extremely resistant to water. A further advantage is a latex adhesive composition which possesses unusually long pot life and is resistant to foam formation. A yet further advantage is the ability to readily adjust viscosity of the adhesive composition without harming performance characteristics of the composition. These and other advantages will be readily apparent to those skilled in the art based upon the disclosure contained herein.

DETAILED DESCRIPTION OF THE INVENTION

The present invention is based upon several unexpected discoveries which were uncovered during the course of research aimed at improving aqueous latex adhesives of the type containing the organic solvent-dispersed isocyanate cross-linking agent as disclosed in U.S. Pat. No. 3,931,088. It is noteworthy for present purposes to recognize that such patent teaches the use of any active-hydrogen group including, for example, carboxyl, hydroxyl, amino, amide, or the like. Moreover, such reactive group can be contained on the SBR latex itself, on a surfactant or stabilizer used in the latex polymerization process, or can be contained in ingredients added to the adhesive composition, eg. PVA thickener or the like. The fundamental discoveries upon which the present invention is based include the elimination of active-hydrogen functionality from all components in the adhesive composition except for the aqueous latex itself. Another discovery is that the active-hydrogen functionality should not be carboxyl or the like, but should be restricted to hydroxyl only. The elimination of carboxyl groups unexpectedly resulted in improved foam suppression and the hydroxyl group placement on the latex restriction resulted in improved water resistance. This combination of restrictions placed on the adhesive composition is not recognized in the art.

Referring initially to the aqueous latex, such aqueous latex bears hydroxyl functionality as its only isocyanate-reactive functionality in accordance with the precepts of the present invention. Desirably, the ingredients used to synthesize the latex are restricted to acrylic monomers for high performance applications, though non-acrylic monomers may find use on occasion. Suitable acrylic monomers include, for example, alkyl esters of acrylic and methacrylic acid, for example, lower alkyl esters of acrylic or methacrylic acid such as methyl acrylate or methyl methacrylate, the propyl acrylate or propyl methacrylates, the butyl acrylates or butyl methacrylates, 2-methylhexyl acrylate, n-octyl acrylate, 2-ethylhexyl acrylate, octyl methacrylate, and similar alkyl acrylates or methacrylates. Hydroxyl-containing acrylic monomers include hydroxyl derivatives of those monomers named above, or pentaerythritol triacrylate, trimethylol propane triacrylate, or the like can be used in providing hydroxyl groups to the latex in conventional fashion. Synthesis of such latices is so common that little more need be said about it here to those skilled in this art. It is important only, however, that the latex contain only hydroxyl functionality as discussed above.

The latex phase should range in particle size from about 3,000 to 9,000 A with typical latex particles ranging around 5,000 A. Such larger latex particle sizes are achievable using the preferred acrylic monomers as noted above. Such particle sizes are larger than the particle sizes typically achieved by SBR latices in the art. Additionally, the latex phase should have a glass transition temperature (hereinafter Tg) ranging from about −3° to 20° C., as the Examples will demonstrate. Additionally, the hydroxyl content of the latex should range from between about 1 and 6% hydroxyl monomer content by weight.

The multi-isocyanate cross-linking agent is a conventional multi-isocyanate used in urethane reactions. Multi-isocyanates preferably will have from about 2–4 isocyanate groups for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)-thiophosphate, cyclohexane diisocyanate (CHDI), bis-(isocyanatomethyl)cyclohexane (H$_6$XDI), dicyclohexylmethane diisocyanate (H$_{12}$MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene and xylene diisocyanate and methyl derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The multi-isocyanate is dispersed in a solvent which dissolves the isocyanate compound or polymer, is a liquid at room temperature, and possesses solubility requirements as disclosed in U.S. Pat. No. 3,931,088. Said patent states that the "solvent" which dissolves the isocyanate compound or polymer, is a liquid at room temperature, and both solubilities, that of "solvent" in water and of water in "solvent", must be below 5 weight percent at a temperature between 20° to 30° C. Typical examples of such solvent are, for example, aliphatic and aromatic hydrocarbons or mixtures thereof, typified by toluene, xylene, benzene, gasoline, kerosene, tetralin, decalin, turpentine oil, pine oil, liquid paraffin and the like; halogenated hydrocarbons typified by, for example, methylene chloride, chlorobenzene, chlorotoluene, and the like; ketones such as, for example, methyl isobutyl ketone, methyl n-amyl ketone, methyl-n-hexyl ketone, ethyl-n-butyl ketone, di-n-propyl ketone and acetophenone; ethers such as, for example, isopropyl ether, methyl phenyl ether, ethyl-benzyl ether, furan and the like; lower aliphatic esters such as, for example, acetic acid isopropyl ester, acetic acid butyl ester, propionic acid butyl ester, and the like; phthalic acid esters such as, for example, phthalic acid butyl ester, phthalic acid dioctyl ester, phthalic acid butyl benzyl ester, and the like; and mixtures thereof.

Further solvents include oleic acid esters, adipic acid esters, azelaic acid esters, sebasic acid esters, stearic acid esters, benzoic acid esters, abietic acid esters, oxalic acid esters and phosphoric acid esters. An additional class of solvents include higher aliphatic acid esters such as glyceride oils. The solvent-protected isocyanate cross-linking agent is formed in accordance with the procedure disclosed in said patent.

The hydroxyl-functional latex and solvent-protected cross-linking agent are the only reactive ingredients in the improved aqueous latex adhesive composition of the present invention. Additional non-functional ingredients find utility in the latex, it must be recognized. Thickeners are quite useful in formulating the adhesive for providing advantageous viscosity adjustment for particular application techniques. Such thickeners or thixotropic agents, however, must not contain groups reactive with the isocyanate cross-linking agent. Representative non-functional thickeners include, for example, poly(alkyl vinyl ethers), poly(N-vinyl pyrrolidone) and its alkylated derivatives, poly(methyl vinyl ether/-maleic anhydride) and its nonionic esters, acrylic acid-/acrylamide copolymers, and the like and mixtures thereof.

Additional ingredients which find use in the adhesive composition are fillers which may be organic or inorganic. Organic fillers include, for example, wood powder, walnut shell powder or the like. Inorganic fillers include, for example, clays such as kaolinite clays, silica, talc, titanium dioxide, zinc oxide, and the like. Advantageously, the inert filler ingredients or fillers are formed into a filler grind and the grind incorporated into the adhesive composition. The grind is formed in conventional fashion as pigment grinds for paints are formed by the use of various attrition mills. Broadly, the filler grind particle size ranges from about 300 A to 30,000 A. Desirably, the filler grind particle size is within the range of particle size for the latex and preferably the particle size is about the same as the latex particle size for forming a monodisperse adhesive composition. The proportion of filler or filler grind utilized can range on up to about 100 wt-% based upon the latex phase. Generally, the fillers will range from between about 20% to about 60% solids by weight of the latex phase.

The improved aqueous latex adhesive composition of the present invention possesses a pot life which can range up to 8 hours (or one shift) which is extremely convenient for factory use of the composition. The latex composition also is relatively free of foam which also improves mechanical handling of the composition. The adhesive composition is formulated by blending, often under high shear conditions, of the aqueous latex phase, the protected isocyanate phase, and the filler ingredients which preferably are provided as a filler grind. The thickener and filler are adjusted to provide a viscosity ranging from about 1,000 to 5,000 centipoises at ambient indoor room temperature. The adhesive composition may be applied by conventional roller coating, both direct and indirect, spray application, dip application, or any application technique that is necessary, desirable, or convenient. Plys of wood can be laminated in conventional fashion under pressures typically used in wood laminate or plywood production. The pressed laminates may be held at ambient indoor temperature for curing of the adhesive or may be heated if an adequate source of heat is available or for special effects. Additionally, the adhesive may be cured by exposure to radio frequency or electromagnetic waves and by microwave radiation. Regardless of the manner of cure, structural laminates of improved strength and water resistance result by using the adhesive composition of the present invention. The improved water resistance is especially noted by Boil/Dry test evaluation of the adhesive as described in detail in the Examples which follow. For structural lamination, the water resistance of the adhesive is an especially valued feature. The performance capabilities of the adhesive are especially accentuated when the adhesive is used to cold set finger joints. Remarkable improvement in performance is experienced in finger joint applications as the Examples will demonstrate. Moreover, Rf curing of finger joints can be readily practiced in commercial scale operations.

The following Examples show how the present invention has been practiced but should not be construed as limiting. In this application, all proportions and percentages are by weight unless otherwise expressly indicated. Also, all citations referenced herein are expressly incorporated herein by reference.

EXAMPLES

Example 1

An adhesive composition was formulated from an aqueous latex phase and an organic cross-linker phase. The aqueous phase consisted of the hydroxyl acrylic latex, a filler grind, and stabilizing additives.

TABLE 1

| Aqueous Phase | Parts by Weight (PBW) |
|---|---|
| Latex | |
| (1) Hydroxyl acrylic latex | 12.65 |
| Filler Grind | |
| (2) Nalco 9SS-068 Thickener | 0.55 |
| (3) CaCO$_3$ | 23.92 |
| (4) Sodium dioctyl sulfosuccinate | 0.24 |
| Demineralized water | 12.65 |
| Additives | |
| (5) Dowicil 75 fungicide | 0.87 |
| (6) Nopco 8034 defoamer | 0.30 |
| (7) Tamol 731 dispersant | 1.91 |
| Toluene | 1.41 |
| Cross-Linker Phase | |
| (8) Mondur MR diisocyanate | 75.0 |
| Dibutyl phthlate | 12.5 |
| Toluene | 12.5 |

(1) Butyl acrylate, methyl methacrylate, 2-hydroxy ethyl acrylate (48.5:49.5:2.0 weight ratio, respectively) supplied at 50% non-volatile solids.
(2) Nalco 9SS-068 liquid polymeric thickener specific gravity 1.072, density 8.93 ± 0.10 lbs/gal, flash point 130° F., 33.4 ± 1 wt % solids, viscosity 740 ± 30 cps (Brookfield, #3 spindle, 60 rpm, 72° F.), Nalco Chemical Company, Oak Brook, Illinois.
(3) Gamma-Sperse 80 brand CaCO$_3$, Georgia Marble Company, Atlanta, Georgia.
(4) Aerosol OT brand of sodium dioctyl sulfosuccinate, 75% solids in water/alcohol, 1.09 g/cm, 200 cps, pH 5-7, acid number 2.5 max., IV .25 max., American Cyanamid Company, Wayne, New Jersey.
(5) Dowicil 75 anti-microbial agent is 1-(3-chloroallyl)-3,5,7-triaza-1-azonia-adamantane chloride (67.5% active by weight, balance is 32.5% inerts and 23% sodium bicarbonate); supplied here in additional demineralized water (0.14 pbw Dowicil 75 in 0.73 pbw water), Dow Chemical U.S.A., Midland, Michigan.
(6) Nopco 8034 defoamer is reported only as an opaque, off-white liquid, 0° F. pour point, 7.5 lb/gal defoamer (Diamond Shamrock Corporation, Morristown, New Jersey).
(7) Tamol 731 brand of sodium salt of a carboxylate polyelectrolyte pigment dispersant, pH 10.0, 25% solids by weight, density (25° C.) 9.2#/gal, Rohm and Haas, Philadelphia, Pennsylvania.
(8) Mondur MR isocyanate is a polymeric diphenylmethane diisocyante, equivalent weight of 133, Mobay Chemical Corporation, Pittsburgh, Pennsylvania.

The adhesive was formulated by preparing the filler grind using a Cowles mill containing all filler ingredients except the CaCO$_3$ which was added under very high shear mixing conditions over a 5 minute interval. The filler grind was let down into the latex phase in the Cowles mill under low agitation conditions followed by the addition of the additives in the order listed above.

The cross-linker phase was prepared in the manner taught in U.S. Pat. No. 3,931,088. Just prior to using the adhesive, the cross-linker phase was dispersed into the aqueous phase (21.55 weight parts of cross-linker phase to 100.0 parts of latex phase) under moderate mixing over a one minute time interval.

The adhesive composition was evaluated on Douglas Fir substrates at a spread rate of 67.2 lbs/1000 ft.$^2$ of wood surface. The samples were pressed at 150 psi (room temperature) overnight. One-half of the samples were aged under ambient conditions for three days, immersed in boiling water for 4 hours, dried for 19 hours at 60° C., boiled 4 more hours, run under cold tap water (15°–20° C.), and then tested (referred to as "boil/dry" test hereinafter). The remaining samples were aged four days under indoor ambient conditions, and then tested on the fourth day (referred to as "normal" test hereinafter).

The wood panels were cut into $\frac{3}{4}$" wide samples for lap shear testing in accordance with ASTM D-1037. The tests were conducted using an Instron Tensile Tester. The "normal" state tensile strength average for five samples was 985.3 psi with 100% wood failure being obtained. The "boil/dry" state tensile strength of five samples tested averaged 704.4 psi with 89.2% average wood failure.

EXAMPLE 2

Further characterization of the latex portion of the adhesive formulation focused on the Tg of the latex. Several acrylic latices were synthesized and formulated into adhesive compositions consisting of non-functional thickener (Gantrez M-154 brand of poly(methyl vinyl ether), 50% aqueous solution, GAF Corporation, New York, N.Y.); the protected isocyanate of Example 1; and the balance being the different Tg latices as set forth below:

TABLE 2

| Latex No. | *Latex Monomer Content (PPHM) | | | Tg (°C.) |
|---|---|---|---|---|
| | BA | MMA | HEA | |
| 30 | 54.1 | 44.9 | 1.0 | −2.5 |
| 44 | 51.64 | 47.36 | 1.0 | 1.0 |
| 28 | 49.11 | 49.89 | 1.0 | 4.7 |
| 51 | 46.91 | 52.09 | 1.0 | 8.0 |
| 45 | 44.31 | 54.69 | 1.0 | 12.0 |
| 52 | 41.78 | 57.22 | 1.0 | 16.0 |

*PPHM is weight parts per hundred weight parts monomer
BA is butyl acrylate
MMA is methyl methacrylate
HEA is 2-hydroxy ethyl acrylate The adhesives were applied to sugar maple plys which were pressed at about 175 psi overnight (room temperature) and then tested as described in Example 1 with the following results:

TABLE 3

| Adhesive No. | Latex Tg (°C.) | Latex pbw | M-154 Thickener (pbw) | Isocyanate (pbw) | Spread Rate (g/in$^2$) | Normal (psi) | Boil/ Dry (psi) |
|---|---|---|---|---|---|---|---|
| 41E | −2.5 | 100.0 | 2.0 | 8.92 | 0.1749 | 999.5 | 1109.3 |
| 49D | 1.0 | 100.0 | 2.0 | 8.86 | 0.1762 | 803.2 | 800.0 |
| 41D | 4.7 | 100.0 | 2.0 | 8.86 | 0.1758 | 1226.1 | 1278.4 |
| 58B | 8.0 | 100.0 | 2.0 | 8.99 | 0.1766 | 1393.1 | 1383.3 |
| 58D | 12.0 | 100.0 | 2.0 | 9.02 | 0.1762 | 1565.9 | 1599.5 |
| 58C | 16.0 | 100.0 | 2.0 | 9.03 | 0.1762 | 1515.2 | 1320.0 |

The above-tabulated results reveal that the preferred latex with 1% hydroxyl monomer content achieved optimum performance characteristics at a Tg of about 12° C. Of course, different latex monomers would provide an optimum Tg not necessarily coincidental with the latex evaluated above. Still, the excellent bond retention under "boil/dry" conditions is demonstrated.

Example 3

Yellow pine horizontal finger joints (0.987 in. depth, Wisconsin Blade) were dipped into an adhesive composition like that in Example 1 using hydroxyl Latex No. 45 of Example 2 and the pieces fitted together to squeeze out excess adhesive. Thereafter, the finger joints were exposed to radio frequency waves (5,000 volts at 0.7 amps, 3.5 kw, 27.12 megahertz frequency) for 18 seconds to cure the adhesive. Another finger joint sample was cured at ambient indoor temperature. Both samples were subjected to modulus of rupture evaluation in accordance with AITC 201–73.

TABLE 4

| Run No. | Mode of Cure | Modulus of Rupture (psi) |
|---|---|---|
| 91–93 | Ambient | 10,023 |
| 76–78 | RF | 9,204 |

The flexibility and adaptability in curing the adhesive composition of the present invention is demonstrated by the above data.

Example 4

Different hydroxyl monomer proportions were evaluated for the preferred latex composition of Example 1 as follows:

TABLE 5

| Latex No. | Latex Monomer Content | | | Tg (°C.) |
|---|---|---|---|---|
| | BA | MMA | HEA | |
| 28 | 49.11 | 48.89 | 1.0 | 4.7 |
| 140 | 48.5 | 49.5 | 2.0 | 4.7 |
| 141 | 45.9 | 48.1 | 6.0 | 4.7 |

The adhesives were applied to sugar maple plys which were pressed and evaluated as in Example 3 with the following results.

TABLE 6

| Adhesive No. | Latex | | M-154 Thickener (pbw) | Isocyanate (pbw) | Spread Rate (g/in$^2$) | Normal (psi) | Boil/Dry (psi) |
|---|---|---|---|---|---|---|---|
| | No. | pbw | | | | | |
| 41D | 28 | 100.0 | 2.0 | 8.87 | 0.1758 | 1226.1 | 1278.4 |
| 143B | 140 | 150.0 | 2.28 | 13.22 | 0.1418 | 1084.3 | 789.3 |
| 143D | 141 | 150.0 | 2.28 | 13.10 | 0.1406 | 1020.8 | 502.9 |

These results indicate that lower hydroxyl monomer content of the latex improves performance.

Example 5

Adhesive formulations were compounded at different filler volume concentrations and evaluated. The filler grinds (Hegman gauge grind 7.5) were made in the manner described in Example 1 from the following ingredients:

| Filler Grind 122 | |
|---|---|
| Ingredient | pbw |
| Demineralized water | 33.86 |
| Aerosol OT Sodium dioctyl sulfosuccinate | 0.65 |
| Nalco 9SS-068 thickener | 1.46 |
| CaCO$_3$ | 64.03 |

Filler grind 122 (100 g) was diluted with an additional 44.44 g of demineralized water to yield a 45% non-volatiles solids grind identified as filler 123B. Filler 123B was blended with Latex No. 51 of Example 3 to yield four different filler volume solids adhesive formulations. These formulations were evaluated on Douglas Fir (22.0 in$^2$ surface) which were pressed at 175 psi as in Example 3.

TABLE 7

| Adhesive No. | Latex 51 (pbw) | Filler 123B (pbw) | Isocyanate (pbw) | Spread Rate (g/in$^2$) | Filler 123B (vol %) | Normal (psi) | Boil/Dry (psi) |
|---|---|---|---|---|---|---|---|
| 140B | 74.59 | 39.96 | 19.43 | 0.1736 | 20 | 764.9 | 426.1 |
| 140C | 60.39 | 55.52 | 19.42 | 0.1750 | 30 | 934.7 | 517.9 |
| 140D | 48.20 | 68.89 | 19.43 | 0.1768 | 40 | 939.6 | 530.2 |
| 140E | 37.55 | 80.53 | 19.43 | 0.1782 | 50 | 767.5 | 651.1 |

These results demonstrate the effect which filler volume has on performance of the adhesive. While the normal tensile strength appears to have reached its maximum at about 30%–40% filler volume concentration, the boil/dry tensile strength still is increasing. Of course, at too high of a filler loading, an insufficient amount of latex and cross-linker will be present to form an effective bond between the substrates.

Example 6

In order to demonstrate the improved performance which all-acrylic latices provide, the hydroxyl latex of Example 1 was compared to an SBR latex (Dow DL 612 styrene-butadiene rubber, 60% styrene/40% butadiene, no carboxyl number, density of 8.416 lb/gal, 47% solids, specific gravity of 1.0253 gm/cc, 2643A average particle size, Dow Chemical U.S.A.) which had no hydroxyl functionality and to an EVA copolymer (DUR-O-SET E230 ethylene vinyl acetate copolymer, 55% nv solids, Tg-15° C., pH 4.5, National Starch & Chemical Corporation, Bridgewater, N.J.) which contained some hydoxyl functionality. The acrylic latex formulation appears below.

Latex No. 31:

BA 48.47 pbw
MMA 49.53 pbw
HEA 2.0 pbw
Tg +4.7° C.

The adhesive formulations were compounded from the ingredients detailed in Example 3 and tested on sugar maple plys with the following results.

TABLE 8

| Adhesive No. | Latex | | M-154 Thickener (pbw) | Isocyanate (pbw) | Spread Rate (g/in$^2$) | Normal (psi) | Boil/Dry (psi) |
|---|---|---|---|---|---|---|---|
| | Tg (°C.) | pbw | | | | | |
| 15B | SBR Comparative | 100.0 | 4.0 | 8.93 | 0.1811 | 670.9 | 808.8 |
| 17B | EVA | 100.0 | 2.0 | 10.03 | 0.1591 | 735.6 | 568.0 |

TABLE 8-continued

| Adhesive No. | Latex Tg (°C.) | pbw | M-154 Thickener (pbw) | Isocyanate (pbw) | Spread Rate (g/in²) | Normal (psi) | Boil/Dry (psi) |
| --- | --- | --- | --- | --- | --- | --- | --- |
| 41B | Comparative Hydroxyl Latex | 100.0 | 2.0 | 8.83 | 0.1766 | 1337.6 | 1347.7 |

The above-tabulated results are indicative of the improved performance that can be expected when an acrylic latex is used in formulating an adhesive. Not only does the present adhesive provide improved lap shear strengths, but such performance is maintained even after being subjected to the boil/dry conditions.

Example 7

The addition of another polyol to the adhesive formulation was evaluated in this Example. The following latex was synthesized:

Latex No. 1B:

BA 36.0
MMA 58.0
HEA 6.0 and compared to a blend of Latex No. 31 (Example 6) and Dow polyol E-400 (polyethylene oxide, MW 400, Dow Chemical U.S.A., Midland, Mich.) which were blended to contain a total polymer hydroxyl content equivalent to Latex No. 1B. The adhesives were tested on red oak which was pressed and evaluated as in the prior Examples.

TABLE 9

| Adhesive No. | Latex No. | pbw | M-154 Thickener (pbw) | Isocyanate (pbw) | Spread Rate (g/in²) | Normal (psi) | Boil/Dry (psi) |
| --- | --- | --- | --- | --- | --- | --- | --- |
| 43B | 1B | 100.0 | *1.0 | 13.21 | 0.1269 | 1360.4 | 312.4 |
|  | E-400 | 2.83 |  |  |  |  |  |
| 43E | 31 | 100.0 | 2.0 | 12.50 | 0.1259 | 1344.8 | 712.8 |

*GAF thickener LN, neutralized solution of partial nonionic esters of Gantrez AN poly(methy vinyl ether/maleic anhydride), 15 ± 0.5% solids, pH 9. ± 0.5, bulk density (20° C.) 8.0 lb/gal, GAF Corporation, New York, New York.

The above-tabulated results demonstrate that the benefit of polyol elimination in the formulation is manifested in the improvement in Boil/Dry lap shear strength. Such improved performance is especially valuable for structural adhesives.

EXAMPLE 8

An acrylic latex polymer containing carboxyl functionality was synthesized for comparison with hydroxyl acrylic latex polymer no. 28, adhesive no. 41D, Example 3.

Latex No. 160:

BA 50.0
MMA 49.0
*MAA 1.0
Tg +4.7° C.
*methacrylic acid.

Latex No. 28:

BA 49.11
MMA 49.89
HEA 1.0
Tg +4.7° C.

The adhesive formulations were applied to sugar maple (22.75 in²), pressed, and evaluated as before.

TABLE 10

| Adhesive No. | Latex No. | pbw | M-154 Thickener (pbw) | Isocyanate (pbw) | Spreas Rate (g/in²) | Normal (psi) | Boil/Dry (psi) |
| --- | --- | --- | --- | --- | --- | --- | --- |
| 166B | 160 | 150.0 | 2.28 | 13.28 | 0.1761 | 1113.1 | 625.6 |
| 41D | 28 | 100.0 | 2.0 | 8.87 | 0.1758 | 1226.1 | 1278.4 |

Again, the achievement of the novel adhesive in Boil/Dry performance is demonstrated. Elimination of carboxyl functionality not only resulted in improved performance, but also foaming was diminished markedly.

We claim:

1. In an aqueous latex adhesive composition of an aqueous latex in admixture with an organic solvent solution of multi-isocyanate cross-linking agent, and a thickener, the improvement for a room temperature-curable adhesive composition having improved water resistance which comprises the curable ingredients consisting essentially of an aqueous hydroxyl-functional acrylic latex which contains hydroxyl groups as its only isocyanate-reactive functionality and said multi-isocyanate cross-linking agent.

2. The adhesive composition of claim 1 wherein said latex is formed from only acrylic monomers.

3. The latex of claim 2 wherein said acrylic monomers contain between about 1 and 6% by weight of a hydroxyl-bearing acrylic monomer.

4. The adhesive composition of claim 1 wherein the glass transition temperature of said latex ranges from between about −3° and +20° C.

5. The adhesive composition of claim 1 wherein said latex particle size ranges from about 3,000 to 9,000 A.

6. The adhesive composition of claim 1 which has a viscosity of between about 1,000 and 5,000 centipoises.

7. The adhesive composition of claim 1 which contains inert filler ingredients.

8. The adhesive composition of claim 4 wherein said latex is a terpolymer of butyl acrylate, methyl methacrylate, and 2-hydroxy ethyl acrylate.

9. The adhesive composition of claim 7 wherein said inert filler ingredients are formed into a grind ranging in size from between about 300 and 30,000 A prior to incorporation into said adhesive composition.

10. A method for making an aqueous latex adhesive composition of claim 1 which comprises:

in an attrition mill forming a filler grind of said filler ingredients ranging in particle size from between about 300 and 30,000 A; and blending said grind with said latex, said cross-linking agent, and said thickener, the only active-hydrogen functionality in said adhesive composition comprising hydroxyl groups on said latex.

11. The method of claim 10 wherein the viscosity of said adhesive composition ranges from between about 1,000 and 5,000 centipoises.

12. The method of claim 10 wherein said latex is synthesized from only acrylic monomers, between about 1 and 6% by weight thereof bearing a hydroxyl group, the glass transition temperature of said latex ranging from between about $-3°$ and $+20°$ C.

13. The method of claim 12 wherein said latex comprises a terpolymer of butyl acrylate, methyl methacrylate, and 2-hydroxyethyl acrylate.

14. A composite of at least two wooden surfaces which are adhesively joined by the dried residue of an aqueous latex adhesive composition, of claim 1.

15. The composite of claim 14 wherein said latex is of acrylic monomers only wherein between 1 and 6% by weight of said acrylic monomers bears a hydroxyl group.

16. The composite of claim 15 wherein the glass transition temperature of said latex ranges from between about $-3°$ and $20°$ C.

17. The composite of claim 15 wherein said latex particle size ranges from between about 3,000 and 9,000 A.

18. The composite of claim 15 wherein said latex is a terpolymer of butyl acrylate, methyl methacrylate, and 2-hydroxy ethyl acrylate.

19. The composite of claim 14 wherein said adhesive composition also contains inert filler ingredients.

20. The composite of claim 14 wherein said adhesive composition is cured at room temperature, by exposure to radio frequency or by exposure to microwaves.

* * * * *